pages/0001.md# United States Patent
Wegner et al.

(10) Patent No.: US 7,297,375 B2
(45) Date of Patent: *Nov. 20, 2007

(54) AQUEOUS COATING MATERIAL THAT CAN BE HARDENED PHYSICALLY, THERMALLY OR THERMALLY AND WITH ACTINIC RADIATION AND THE UTILIZATION THEREOF

(75) Inventors: Egon Wegner, Veitshöchheim (DE); Stephan Schwarte, Emsdetten (DE); Frank Jansing, Tauberbischofsheim (DE)

(73) Assignee: BASF Coatings AG, Munster (DE)

( * ) Notice: Subject to any disclaimer, the term of this patent is extended or adjusted under 35 U.S.C. 154(b) by 135 days.

This patent is subject to a terminal disclaimer.

(21) Appl. No.: 10/181,863

(22) PCT Filed: Jan. 30, 2001

(86) PCT No.: PCT/EP01/00973

§ 371 (c)(1),
(2), (4) Date: Aug. 14, 2002

(87) PCT Pub. No.: WO01/57142

PCT Pub. Date: Aug. 9, 2001

(65) Prior Publication Data

US 2003/0139512 A1 Jul. 24, 2003

(30) Foreign Application Priority Data

Feb. 2, 2000 (DE) .............................. 100 04 494

(51) Int. Cl.
*C08K 7/18* (2006.01)
*B05D 3/06* (2006.01)

(52) U.S. Cl. ................ 427/553; 523/223; 524/417; 524/442; 524/445; 524/456; 524/492; 524/493; 524/494; 524/590; 524/591; 427/402; 427/372.2

(58) Field of Classification Search ........... 524/446, 524/417, 445, 493, 494, 590, 591, 791, 847; 523/220, 221, 223; 528/85; 427/402, 372.2, 427/553

See application file for complete search history.

(56) References Cited

U.S. PATENT DOCUMENTS

| 3,361,844 A | | 1/1968 | Hoeschele ................. 260/858 |
| 3,714,107 A | * | 1/1973 | Smith ......................... 523/220 |
| 4,171,228 A | * | 10/1979 | Lowrey ...................... 106/409 |
| 4,220,679 A | | 9/1980 | Backhouse |
| 4,268,542 A | | 5/1981 | Sakakibara et al. ......... 427/195 |
| 4,366,185 A | * | 12/1982 | Tanaka et al. .............. 427/386 |
| 4,403,003 A | | 9/1983 | Backhouse |
| 4,489,135 A | | 12/1984 | Drexler et al. ........... 428/423.1 |
| 4,652,470 A | | 3/1987 | Das et al. |
| 4,675,234 A | | 6/1987 | Sachs et al. ................. 428/328 |
| 4,680,204 A | | 7/1987 | Das et al. |
| 5,028,639 A | | 7/1991 | Treutlein et al. ............ 523/200 |
| 5,157,069 A | * | 10/1992 | Campbell ................... 524/500 |
| 5,210,154 A | | 5/1993 | Weidemeier et al. ....... 525/438 |
| 5,334,420 A | | 8/1994 | Hartung et al. .......... 427/407.1 |
| 5,356,669 A | | 10/1994 | Rehfuss et al. .......... 427/407.1 |
| 5,425,970 A | | 6/1995 | Lahrmann et al. .......... 427/493 |
| 5,516,559 A | | 5/1996 | Röockrath et al. ....... 427/407.1 |
| 5,574,103 A | | 11/1996 | Wu et al. ................... 525/127 |
| 5,589,228 A | | 12/1996 | Wegner et al. |
| 5,601,878 A | | 2/1997 | Kranig et al. ............... 427/386 |
| 5,601,880 A | | 2/1997 | Schwarte et al. |
| 5,686,531 A | | 11/1997 | Engelke et al. |
| 5,691,425 A | | 11/1997 | Klein et al. ................. 525/455 |
| 5,707,941 A | | 1/1998 | Haberle ...................... 528/44 |
| 5,716,678 A | | 2/1998 | Röckrath et al. |
| 5,863,321 A | * | 1/1999 | Crumley et al. ............ 106/404 |
| 5,965,213 A | | 10/1999 | Sacharski et al. ........... 427/475 |
| 6,001,424 A | | 12/1999 | Lettmann et al. ........ 427/407.1 |
| 6,001,915 A | | 12/1999 | Schwarte et al. ........... 524/457 |
| 6,159,556 A | | 12/2000 | Möller et al. |
| 6,162,506 A | | 12/2000 | Lettmann et al. ........ 427/407.1 |
| 6,242,056 B1 | * | 6/2001 | Spencer et al. ............. 427/512 |
| 6,344,501 B1 | | 2/2002 | Sierakowski et al. |
| 6,403,699 B1 | | 6/2002 | Röckrath et al. |
| 6,555,612 B1 | | 4/2003 | Mayer et al. |
| 6,607,788 B1 | | 8/2003 | Wegner et al. |

FOREIGN PATENT DOCUMENTS

| CA | 2102169 | 11/1999 |
| CA | 2079498 | 2/2002 |
| DE | 19904330 | 8/2000 |
| EP | 113435 | 7/1984 |
| EP | 249 201 | 6/1987 |

(Continued)

OTHER PUBLICATIONS

Szycher, Michael. Szycher's Handbook of Polyurethanes. F.L., CRC Press LLC, 1999. p. 14-1-14-2. TP1180.P8S98.*

(Continued)

*Primary Examiner*—Vasu Jagannathan
*Assistant Examiner*—Vickey Ronesi

(57) ABSTRACT

An aqueous coating material curable physically, thermally, or both thermally and with actinic radiation, comprising
A) at least one ionically and/or nonionically stabilized polyurethane which is saturated, unsaturated and/or grafted with olefinically unsaturated compounds, as binder,
B) at least one color and/or effect pigment, and
C) at least one colorless, transparent or opaque powder which is substantially inert with respect to the other constituents of the coating material and whose particles have an average size of from 1.0 to 10.0 μm and a density of from 0.8 to 3.6 g cm$^{-3}$;
and its use for producing single-coat and multicoat color and/or effect paint systems on primed and unprimed substrates.

15 Claims, No Drawings

FOREIGN PATENT DOCUMENTS

| | | |
|---|---|---|
| EP | 276 501 | 9/1987 |
| EP | 354 261 | 8/1988 |
| EP | 424 705 | 10/1990 |
| EP | 522 420 | 6/1992 |
| EP | 594 068 | 10/1993 |
| EP | 594 071 | 10/1993 |
| EP | 594 142 | 10/1993 |
| EP | 702055 | 3/1996 |
| FR | 2746809 | 10/1997 |
| GB | 1127338 | 6/1967 |
| GB | 1220717 | 9/1968 |
| JP | 03075137 A * | 3/1991 |
| WO | WO91/12899 | 9/1991 |
| WO | WO92/22615 | 12/1992 |
| WO | WO93/17060 | 9/1993 |
| WO | WO94/10211 | 5/1994 |
| WO | WO94/10212 | 5/1994 |
| WO | WO94/10213 | 5/1994 |
| WO | WO94/22968 | 10/1994 |
| WO | WO94/22969 | 10/1994 |
| WO | WO96/12754 | 5/1996 |
| WO | WO97/12945 | 4/1997 |
| WO | WO97/49745 | 12/1997 |
| WO | WO97/49747 | 12/1997 |

OTHER PUBLICATIONS

Lide, David R. CRC Handbook of Chemistry and Physics [online]. 2004 [retrieved on Jun. 18, 2004]. p. 4-48, 4-49, 4-67. Retrieved from the Internet:<URL: http://www.hbcpnetbase.com/home.asp>.*

Lewis Sr., Richard J.; Hawley's Condensed Chemical Dictionary, John Wiley and Sons, New York 1997 (p. 227, 907, 909).*

Lewis Sr., Richard J.; Hawley's Condensed Chemical Dictionary, John Wiley and Sons, New York 1997 (p. 277).*

Wypych, Goerge. Handbook of Fillers, 2nd Edition. Toronto, Plastics Design Library, 2000, p. 75, 87. TP1114.W96.*

English Abstract for DE40098858, Oct. 2, 1991.

English Abstract for DE19645761, May 7, 1998.

English Abstract for WO94/22968 on front page of the International Publication, Oct. 13, 1994.

English Abstract for WO91/12899 on front page of the International Publication, Sep. 5, 1991.

English Abstract for DE19741554, Jun. 10, 1999.

English Abstract for DE19912661, Nov. 18, 1999.

English Abstract for WO94/22696 on front page of the International Publication, Oct. 13, 1994.

English Abstract for WO92/22615 on front page of the International Publication, Dec. 23, 1992.

English Abstract for EP008 127, Feb. 20, 1980.

English Abstract for DE19736535, Jan. 28, 1998.

English Abstract for DE19618657, Jan. 2, 1997.

English language Abstract for FR2746809 from EPO, Oct. 3, 1997.

Machine Translation of JP08231904 from JPO, Sep. 10, 1996.

English language Abstract for JP08231904 from EPO, Oct. 9, 1996.

* cited by examiner

AQUEOUS COATING MATERIAL THAT CAN BE HARDENED PHYSICALLY, THERMALLY OR THERMALLY AND WITH ACTINIC RADIATION AND THE UTILIZATION THEREOF

This application is a National Phase Application of Patent Application PCT/EP01/00973 filed on Jan. 30, 2001.

The present invention relates to a novel polyurethane-based aqueous coating material and to its use for producing single-coat and multicoat color and/or effect paint systems in automotive OEM finishing and automotive refinish, in industrial coating, including coil coating and container coating, in the coating of plastics, and in furniture coating.

Aqueous coating materials curable thermally and comprising a crosslinking agent, a color and/or effect pigment, and an ionically and/or nonionically stabilized polyurethane which is saturated, unsaturated and/or grafted with olefinically unsaturated compounds and is based on aliphatic, cycloaliphatic, aliphatic-cycloaliphatic, aromatic, aliphatic-aromatic and/or cycloaliphatic-aromatic polyisocyanates, and the corresponding paint systems, are known, for example, from patent EP-A-0 089 497, DE-A-44 37 535, DE-C-197 22 862 or DE-A-196 45 761. These known aqueous coating materials, especially the aqueous basecoat materials, and the single-coat or multicoat color and/or effect paint systems produced with them possess very good performance properties.

Where the single-coat or multicoat color and effect paint systems produced from the known aqueous basecoat materials comprise effect pigments, especially metallic pigments, there may be formation of what are known as clouds, i.e., areas of light/dark shading. These are an indicator of deficiencies in dispersing and/or orienting the color and/or effect pigments, especially the effect pigments, in the finish. However, it is precisely in the case of particularly high-value products having extensive finishes, such as automobiles, for example, that cloudy finishes are fundamentally unacceptable, since paint defects of this kind suggest low quality in the entire product (e.g., the automobile).

It is an object of the present invention to provide a novel aqueous coating material which is curable thermally, or thermally and with actinic radiation, and which is very highly suitable as an aqueous basecoat material or solid-color topcoat material for producing single-coat and multicoat color and effect paint systems which exhibit markedly reduced clouding tendency. Furthermore, the otherwise excellent performance properties of the existing aqueous basecoat materials and solid-color topcoat materials ought not to be impaired, but instead retained in their entirety. Not least, the reduction in clouding ought also to accompany overcoating of the novel aqueous basecoat films with any of a wide variety of clearcoats.

The invention accordingly provides the novel aqueous coating material curable physically, thermally and/or with actinic radiation, which comprises A) at least one ionically and/or nonionically stabilized polyurethane which is saturated, unsaturated and/or grafted with olefinically unsaturated compounds, as binder, B) at least one color and/or effect pigment, and C) at least one colorless, transparent or opaque powder which is substantially inert with respect to the other constituents of the coating material and whose particles have an average size of from 1.0 to 10.0 µm and a density of from 0.8 to 3.6 g cm$^{-3}$ and is referred to below as the "coating material of the invention".

Further subject matter of the invention will emerge from the following description.

In the light of the prior art it was surprising and unforeseeable for the skilled worker that the object on which the present invention is based could be achieved by means of the specially selected powder (C) for use in accordance with the invention. Indeed, the expectation was more that the use of powders (C) whose average particle size lies within the order of magnitude of the dry film thickness of the basecoats or solid-color topcoats produced from the coating materials of the invention would be accompanied by serious disadvantages, especially with regard to the quality of the overall appearance and the level of intercoat adhesion.

The coating material of the invention is physically curing.

In the context of the present invention, the term "physical curing" denotes the curing of a layer of a coating material by filming through loss of solvent from the coating material, with linking within the coating taking place via looping of the polymer molecules of the binders (regarding the term, cf. Römpp Lexikon Lacke und Druckfarben, Georg Thieme Verlag, Stuttgart, N.Y., 1998, "binders", pages 73 and 74). Or else filming takes place by way of the coalescence of binder particles (cf. Römpp Lexikon Lacke und Druckfarben, Georg Thieme Verlag, Stuttgart, N.Y., 1998, "curing", pages 274 and 275). Normally, no crosslinking agents are required for this purpose. Where appropriate physical curing may be assisted by atmospheric oxygen, by heat or by exposure to actinic radiation.

The coating material of the invention is thermally curable. In this context it may be self-crosslinking or externally crosslinking.

In the context of the present invention, the term "self-crosslinking" refers to the capacity of a binder to enter into crosslinking reactions with itself. A prerequisite for this is that the binders already contain both kinds of complementary reactive functional groups which are necessary for crosslinking. Externally crosslinking coating materials, adhesives and sealing compounds, on the other hand, are those in which one kind of the complementary reactive functional groups is present in the binder and the other kind is present in a curing or crosslinking agent. For further details, refer to Römpp Lexikon Lacke und Druckfarben, Georg Thieme Verlag, Stuttgart, N.Y., 1998, "curing", pages 274 to 276, especially page 275, bottom.

The coating material of the invention is curable thermally and with actinic radiation. Where thermal curing and curing with actinic light are employed together in the context of one coating material, the terms "dual cure" and "dual-cure coating material" are also used.

In the context of the present invention, actinic radiation means electromagnetic radiation, such as visible light, UV radiation or X-rays, especially UV radiation, and corpuscular radiation, such as electron beams.

The coating material of the invention is a one-component (1K) system.

In the context of the present invention, a one-component (1K) system is a coating material curable thermally or thermally and with actinic radiation in which the binder and the crosslinking agent are present alongside one another, i.e., in one component. A prerequisite for this is that the two constituents crosslink with one another only at relatively high temperatures and/or on exposure to actinic radiation.

The coating material of the invention may also be a two-component (2K) or multicomponent (3K, 4K) system.

In the context of the present invention, this means a coating material in which in particular the binder and the crosslinking agent are present separately from one another in at least two components which are not combined until shortly before application. This form is chosen when binder and crosslinking agent react with one another even at room temperature. Coating materials of this kind are employed in particular for coating thermally sensitive substrates, especially in automotive refinish.

The coating material of the invention is aqueous. This means that its constituents are present in dispersion and/or solution in water or in a mixture of water and minor amounts of at least one water-miscible organic solvent. In this context, "minor amounts" are amounts which do not destroy the aqueous nature of the mixture.

The inventively essential constituent of the coating material of the invention is the powder (C). This powder (C) is a powder of uniform composition, i.e., its particles materially have the same composition. Or else it is a mixture of at least two powders (C). The decision as to which variant is given preference is guided by the requirements which are imposed on the coating material of the invention in the case in hand. In the great majority of cases, the use of one powder (C) is sufficient to achieve the advantages according to the invention.

The powder (C) for use in accordance with the invention is colorless. This means that it has no hue and no chroma but only lightness. Accordingly, it is white or has a gray shade. Preferably, however, it is white. For further details, refer to Römpp Lexikon Lacke und Druckfarben, Georg Thieme Verlag, Stuttgart, N.Y., 1998, "achromatic point", page 590.

The powder (C) is transparent in the sense of clear or opaque in the sense of hiding. Preference is given to using transparent powders (C).

The powder (C) is substantially inert. This means that, within the period of time commonly envisaged for the preparation, storage, and processing of the coating material of the invention, it is soluble only sparingly if at all in water and in the organic solvents possibly still present in the coating material of the invention, does not absorb any major constituents of the coating material or cause them to flocculate, does not enter into any chemical reactions, or enters into only very slowly proceeding chemical reactions, with essential constituents of the coating material, does not catalyze any chemical reactions between the essential constituents of the coating material, and is unaltered, or altered only very slowly, in its properties by heat and/or actinic light.

The powder (C) has an average particle size of from 1.0 to 10.0, preferably from 3.0 to 7.5, and in particular from 4.0 to 7.0 µm.

Advantageous powders (C) have a comparatively narrow particle size distribution. In other words, the fractions both of fine material and of coarse material are comparatively low. Particularly advantageous powders (C) have a maximum particle size of below 12, preferably below 11 and in particular below 10 µm.

The particles of the powder (C) for use in accordance with the invention have a density of from 0.8 to 3.6, preferably from 0.9 to 3.4, more preferably from 1.0 to 3.2, and in particular from 1.1 to 3.0 g cm$^3$.

In certain cases it would also be possible to use particles having a lower density; in that case, however, the risk exists of the particles floating in the coating materials on prolonged storage. Alternatively, it would also be possible in certain cases to use particles having a higher density; in that case, however, the risk exists of the particles settling fairly rapidly on prolonged storage.

The particles of the powders (C) for use in accordance with the invention may be of any desired shape. In accordance with the invention it is of advantage if they have a spherical shape. In the context of the present invention, a spherical shape is a shape substantially like that of a ball. Examples of spherical shapes are beads, egg-shaped particles, dodecahedra or icosahedra, which may also have certain irregularities.

Examples of suitable substances of which the particles or powders (C) may consist are crosslinked or uncross-linked, organic or organometallic polymers, inorganic minerals, salts or ceramic materials, or organically modified ceramic materials, or mixtures of these substances. Of these, the inorganic minerals are of advantage and are therefore used with preference. These minerals may be natural minerals or synthetic minerals.

Examples of the highly suitable minerals are silicon dioxide, aluminum silicates, calcium silicates, magnesium silicates, calcium aluminum silicates, magnesium aluminum silicates, calcium magnesium silicates, calcium magnesium aluminum silicates, beryllium aluminum silicates, aluminum phosphate or calcium phosphate, or mixtures thereof. Of these, silicon dioxide is particularly advantageous and is therefore used with particular preference in accordance with the invention.

The preparation of the powders (C) for use in accordance with the invention has no special features in terms of its method but instead takes place with the aid of methods such as are customary and known in the field of organic, organometallic or inorganic chemistry. For example, organic polymers may be produced by emulsion, dispersion or precipitation polymerization or by size reduction, for example by grinding or spraying, of melts or solutions of ready-produced polymers. The inorganic particles may be produced, for example, by precipitation processes and/or size reduction. In the case of ceramic materials, it is normal first to produce a green body, which may already have the desired powder form, and then to fire it.

Where appropriate, the surfaces of the particles are subjected to an aftertreatment, for example, to a hydrophilicizing or hydrophobicizing treatment. However, the aftertreatment must not remove the inertness of the particles.

The powders (C) may be incorporated as they are into the coating materials of the invention, provided they are readily dispersed and do not agglomerate. In accordance with the invention it is of advantage if the powders (C) are incorporated in the form of powder pastes. Further advantages result if the paste resins or grinding resins used comprise binders which are present in the coating material of the invention.

The amount of the powders (C) in the coating materials of the invention may vary very widely and is guided primarily by the intensity of the light/dark shading that is to be avoided and by the specified shade of the color and effect coating which is produced from the respective coating material of the invention. It is preferred to employ from 0.09 to 5.0%, more preferably from 0.12 to 3.5%, and in particular from 0.3 to 2.5% by weight, based in each case on the solids content of the coating material of the invention.

The further essential constituent of the coating material of the invention is at least one binder (A).

In accordance with the invention, said binder (A) comprises at least one ionically and/or nonionically stabilized polyurethane (A) which is saturated, unsaturated and/or grafted with olefinically unsaturated compounds.

Advantageously, depending on the nature of the stabilization, the polyurethane (A) for inventive use has an acid number or amine number of from 10 to 250 mg KOH/g (ionic stabilization or nonionic plus ionic stabilization) or of from 0 to 10 mg KOH/g (nonionic stabilization), an OH number of from 30 to 350 mg KOH/g, and a number average molecular weight of from 1500 to 100,000 daltons.

The method of preparing the polyurethane (A) is arbitrary. It is preferably obtainable by preparing, in a first process step, a polyurethane prepolymer which contains at least one free isocyanate group.

The polyurethane prepolymer is of linear, branched or comb, but especially linear, construction. In this context the linear polyurethane prepolymer includes preferably two free isocyanate groups, especially two terminal free isocyanate groups. The branched or comb-constructed polyurethane prepolymers include preferably at least two, in particular more than two, free isocyanate groups, terminal free isocyanate groups being preferred.

In terms of method, the preparation of the polyurethane prepolymers for use in accordance with the invention has no special features but instead takes place, for example, as described in patent DE-C-197 22 862, DE-A196 45 761, DE-A-44 37 535, EP-A-0 522 419 or EP-A0 522 420, by reaction of at least one polyol, especially a diol, with at least one polyisocyanate, especially a diisocyanate, the isocyanate component being employed in a molar excess so as to give terminal free isocyanate groups.

For the preparation of the polyurethane prepolymers it is preferred to use diisocyanates and also, if desired, in minor amounts, polyisocyanates, for the purpose of introducing branches. In the context of the present invention, minor amounts are amounts which do not cause gelling of the polyurethane prepolymers during their preparation. This may also be prevented by using small amounts of monoisocyanates.

Examples of suitable diisocyanates are isophorone diisocyanate (i.e., 5-isocyanato-1-isocyanatomethy-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate or diisocyanates derived from dimeric fatty acids, as marketed under the commercial designation DDI 1410 by the company Henkel and described in the patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl) cyclohexane, 1,2-, 1,4- or 1,3-bis(4-isocyanatobut-1-yl) cyclohexane, liquid bis(4-isocyanatocyclohexyl)methane with a trans/trans content of up to 30% by weight, preferably 25% by weight, and in particular 20% by weight, as is described by the patents DE-A-44 14 032, GB-A-1220717, DE-A-16 18 795 or DE-A-17 93 785; tetramethylxylylidene diisocyanate (TMXDI® from CYTEC), tolylene diisocyanate, xylylene diisocyanate, bisphenylene diisocyanate, naphthylene diisocyanate or diphenylmethane diisocyanate.

Examples of suitable polyisocyanates based on the diisocyanates described above are isocyanato-containing polyurethane prepolymers, which have been prepared by reacting polyols with an excess of at least one of the above-described diisocyanates, and/or polyisocyanates containing isocyanurate, biuret, allophanate, iminooxadiazinedione, urethane, urea and/or uretdione groups. It is preferred to use polyisocyanates containing on average from 2.5 to 5 isocyanate groups per molecule and having viscosities of from 100 to 10 000, preferably from 100 to 5000 mPas. Furthermore, the polyisocyanates may have been subjected to conventional hydrophilic or hydrophobic modification.

Very particular preference is given to mixtures of polyisocyanates which contain uretdione and/or isocyanurate and/or allophanate groups and which are based on the above-described diisocyanates as formed by catalytic oligomerization of diisocyanates using appropriate catalysts.

Examples of suitable monoisocyanates are phenyl isocyanate, cyclohexyl isocyanate or stearyl isocyanate, or vinyl isocyanate, methacryloyl isocyanate, and/or 1-(1-isocyanato-1-methylethyl)-3-(1-methyl-ethenyl)benzene (TMI® from CYTEC).

Examples of suitable polyols are saturated or olefinically unsaturated polyesterpolyols which are prepared by reacting
  unsulfonated or sulfonated saturated and/or unsaturated polycarboxylic acids or their esterifiable derivatives, alone or together with monocarboxylic acids, and
  saturated and/or unsaturated polyols, alone or together with monools.

Examples of suitable polycarboxylic acids are aromatic, aliphatic and cycloaliphatic polycarboxylic acids. Preference is given to the use of aromatic and/or aliphatic polycarboxylic acids.

Examples of suitable aromatic polycarboxylic acids are phthalic acid, isophthalic acid, terephthalic acid, phthalic, isophthalic or terephthalic acid monosulfonate, or halophthalic acids, such as tetrachlorophthalic or tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid, or dimeric fatty acids or maleic acid, fumaric acid or itaconic acid, of which adipic acid, glutaric acid, azelaic acid, sebacic acid, dimeric fatty acids and maleic acid are advantageous and are therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Also suitable are the esterifiable derivatives of the abovementioned polycarboxylic acids, such as their monoesters or polyesters with aliphatic alcohols having 1 to 4 carbon atoms or hydroxy alcohols having 1 to 4 carbon atoms, for example. It is also possible to use the anhydrides of the abovementioned polycarboxylic acids, where they exist.

Together with the polycarboxylic acids it is also possible if desired to use monocarboxylic acids, such as, for example, benzoic acid, tert-butylbenzoic acid, lauric acid, isononanoic acid, fatty acids of naturally occurring oils, acrylic acid, methacrylic acid, ethacrylic acid or crotonic acid. The preferred monocarboxylic acid used is isononanoic acid.

Examples of suitable polyols are diols and triols, especially diols. Normally, triols are used alongside the diols in minor amounts in order to introduce branches into the polyester polyols.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethyl-bicyclo[2.2.1]heptane, 2,2-diethyl-1,3-propanediol, 2,2-dipropyl-1,3-propanediol 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene and 1,3-bis(2'-hydroxypropyl)benzene.

These diols may also be used per se for the preparation of the polyurethanes (A) for inventive use.

Of these diols, hexanediol and neopentyl glycol are particularly advantageous and are therefore used with particular preference.

Examples of suitable triols are trimethylolethane, trimethylolpropane or glycerol, especially trimethylolpropane.

The abovementioned triols may also be used per se to prepare the polyurethanes (A) for inventive use (cf. patent EP-A-0 339 433).

If desired, minor amounts of monools may also be used. Examples of suitable monools are alcohols or phenols such as ethanol, propanol, n-butanol, sec-butanol, tert-butanol, amyl alcohols, hexanols, fatty alcohols, allyl alcohol, or phenol.

The polyesterpolyols may be prepared in the presence of small amounts of a suitable solvent as entrainer. Examples of entrainers used are aromatic hydrocarbons, such as especially xylene and (cyclo)aliphatic hydrocarbons, e.g., cyclohexane or methylcyclohexane.

Further examples of suitable polyols are polyesterdiols which are obtained by reacting a lactone with a diol. They are notable for the presence of terminal hydroxyl groups and repeating polyester fractions of the formula —(—CO—(CHR)$_m$—CH$_2$—O—)—. Here, the index m is preferably from 4 to 6 and the substituent R is hydrogen or an alkyl, cycloalkyl, or alkoxy radical. No substituent contains more than 12 carbon atoms. The total number of carbon atoms in the substituent does not exceed 12 per lactone ring. Examples are hydroxycaproic acid, hydroxybutyric acid, hydroxydecanoic acid, and/or hydroxystearic acid.

Preferred for the preparation of the polyesterdiols is the unsubstituted $\epsilon$-caprolactone, where m is 4 and all substituents R are hydrogen. The reaction with lactone is started by low molecular mass polyols such as ethylene glycol, 1,3-propanediol, 1,4-butanediol, or dimethylolcyclohexane. It is also possible, however, to react other reaction components, such as ethylenediamine, alkyldialkanolamines, or else urea, with caprolactone. Other suitable diols of relatively high molecular mass are polylactamdiols, which are prepared by reacting, for example, $\epsilon$-caprolactam with low molecular mass diols.

Further examples of suitable polyols include polyetherpolyols, especially those having a number-average molecular weight of from 400 to 5000, in particular from 400 to 3000. Examples of highly suitable polyetherdiols are polyetherdiols of the general formula H—(—O—(CH R$^1$)$_o$—)$_p$OH, where the substituent R$^1$ is hydrogen or a lower, unsubstituted or substituted alkyl radical, the index o is from 2 to 6, preferably from 3 to 4, and the index p is from 2 to 100, preferably from 5 to 50. Especially suitable examples are linear or branched polyetherdiols such as poly(oxyethylene) glycols, poly(oxypropylene) glycols, and poly(oxybutylene) glycols.

The polyetherdiols should, firstly, not introduce excessive amounts of ether groups, since otherwise the polyurethanes (A) for inventive use that are formed start to swell in water. Secondly, they may be used in amounts which ensure the nonionic stabilization of the polyurethanes (A). In that case they act as the functional nonionic groups (a3) described below.

The polyurethane (A) for inventive use comprises alternatively (a1) functional groups convertible into cations by neutralizing agents and/or quaternizing agents, and/or cationic groups, or (a2) functional groups convertible into anions by neutralizing agents, and/or anionic groups, and/or (a3) nonionic hydrophilic groups.

Examples of suitable functional groups (a1) for inventive use which are convertible into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (a1) for inventive use are primary, secondary, tertiary or quaternary ammonium groups, tertiary sulfonium groups or quaternary phosphonium groups, preferably quaternary ammonium groups, quaternary phosphorium groups or tertiary sulfonium groups, but especially tertiary sulfonium groups.

Examples of suitable functional groups (a2) for inventive use which are convertible into anions by neutralizing agents are carboxylic acid, sulfonic acid or phosphonic acid groups, especially carboxylic acid groups.

Examples of suitable anionic groups (a2) for inventive use are carboxylate, sulfonate or phosphonate groups, especially carboxylate groups.

Examples of suitable neutralizing agents for the functional groups (a1) convertible into cations are organic and inorganic acids such as formic acid, acetic acid, lactic acid, dimethylolpropionic acid, citric acid, sulfuric acid, hydrochloric acid, and phosphoric acid.

Examples of suitable neutralizing agents for the functional groups (a2) convertible into anions are ammonia, ammonium salts, such as ammonium carbonate or ammonium bicarbonate for example, and also amines, such as trimethylamine, triethylamine, tributylamine, dimethylaniline, diethylaniline, triphenylamine, dimethylethanolamine, diethylethanolamine, methyldiethanolamine, triethanolamine and the like, for example. Neutralization may take place in organic phase or in aqueous phase. A preferred neutralizing agent used is dimethylethanolamine.

The amount of neutralizing agent used overall in the coating composition of the invention is chosen so that from 1 to 100 equivalents, preferably from 50 to 90 equivalents, of the functional groups (a1) or (a2) of the polyurethane (A) for inventive use are neutralized.

The introduction of hydrophilic functional (potentially) cationic groups (a1) into the polyurethane prepolymers takes place by way of the incorporation of compounds which contain in the molecule at least one, especially two, isocyanate-reactive groups and at least one group which is capable of forming cations; the amount to be used may be calculated from the target amine number.

Suitable isocyanate-reactive groups are, in particular, hydroxyl groups and also primary and/or secondary amino groups, of which the hydroxyl groups are used with preference.

Examples of suitable compounds are 2,2-dimethylolethylamine or -propylamine blocked with a ketone, the resulting ketoxime group being hydrolyzed again before the cationic group (a1) is formed, or N,N-dimethyl-, N,N-diethyl- or N-methyl-N-ethyl-2,2-dimethylolethyl- or -propylamine.

The introduction of (potentially) anionic groups (a2) into the polyurethane molecules takes place by way of the incorporation of compounds which contain in the molecule at least one isocyanate-reactive group and at least one group capable of forming anions; the amount to be used may be calculated from the target acid number.

Examples of suitable compounds of this kind are those containing two isocyanate-reactive groups in the molecule. Suitable isocyanate-reactive groups are those described above. Accordingly it is possible, for example, to use alkanoic acids having two substituents on the α carbon atom. The substituent may be a hydroxyl group, an alkyl group, or, preferably, an alkylol group. These alkanoic acids have at least one, generally from 1 to 3, carboxyl groups in the molecule. They have 2 to about 25, preferably 3 to 10, carbon atoms. Examples of suitable alkanoic acids are dihydroxypropionic acid, dihydroxysuccinic acid, and dihydroxybenzoic acid. A particularly preferred group of alkanoic acids are the α,α-dimethylolalkanoic acids of the general formula $R^2$—$C(CH_2OH)_2COOH$, $R^2$ being a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimethylolpentanoic acid. The preferred dihydroxyalkanoic acid is 2,2-dimethylolpropionic acid. Examples of compounds containing amino groups are α,δ-diaminovaleric acid, 3,4-diaminobenzoic acid, 2,4-diaminotoluenesulfonic acid, and 2,4-diaminodiphenyl ether sulfonic acid.

Nonionic stabilizing poly(oxyalkylene) groups (a3) may be introduced as lateral or terminal groups into the polyurethane molecules. For this purpose it is possible to use, for example, alkoxypoly(oxyalkylene) alcohols having the general formula $R^3O$—$(-CH_2$—$CHR^4$—$O-)_rH$, where $R^3$ is an alkyl radical having 1 to 6 carbon atoms, $R^4$ is a hydrogen atom or an alkyl radical having 1 to 6 carbon atoms, and the index r is a number between 20 and 75 (cf. patents EP-A-0 354 261 or EP-A-0 424 705).

Of these functional (potentially) ionic groups (a1) and (a2) and functional nonionic groups (a3), the (potentially) anionic groups (a2) are advantageous and are therefore used with particular preference.

The use of polyols, polyamines and amino alcohols brings about an increase in the molecular weight of the polyurethane prepolymers (A).

Suitable polyols for the chain extension are polyols having up to 36 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A, or mixtures thereof (cf. patents EP-A-0 339 433, EP-A-0 436 941, EP-A-0 517 707).

Examples of suitable polyamines have at least two primary and/or secondary amino groups. Polyamines are essentially alkylene polyamines having 1 to 40 carbon atoms, preferably about 2 to 15 carbon atoms. They may carry substituents which have no hydrogen atoms that are reactive with isocyanate groups. Examples are polyamines having a linear or branched aliphatic, cycloaliphatic or aromatic structure and at least two primary amino groups.

Diamines include hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,4'-diaminodicyclohexylmethane, and aminoethyleneethanolamine. Preferred diamines are hydrazine, alkyl- or cycloalkyldiamines such as propylenediamine and 1-amino-3-aminomethyl-3,5,5-trimethylcyclohexane.

It is also possible to use polyamines containing more than two amino groups in the molecule. In these cases, however, it should be ensured—for example, by using monoamines as well—that no crosslinked polyurethane resins are obtained. Polyamines of this kind which may be used are diethylenetriamine, triethylenetetramine, dipropylenediamine, and dibutylenetriamine. An example of a monoamine is ethylhexylamine (cf. patent EP-A-0 089 497).

Examples of suitable amino alcohols are ethanolamine and diethanolamine.

The polyurethanes (A) for inventive use may contain terminal and/or lateral olefinically unsaturated groups. Groups of this kind may be introduced, for example, with the aid of compounds containing at least one isocyanate-reactive group, especially hydroxyl group, and at least one vinyl group. Examples of suitable compounds of this kind are trimethylolpropane monoallyl ether and trimethylolpropane mono(meth)-acrylate.

The polyurethanes (A) for inventive use may be grafted with ethylenically unsaturated compounds. Examples of suitable polyurethanes (A) for inventive use, in the form of graft copolymers, are known from patents EP-A-0 521 928, EP-A-0 522 420, EP-A-0 522 419 or EP-A-0 730 613.

The method of preparing the polyurethanes (A) for inventive use has no special features but instead takes place in accordance with the customary and known methods such as those described in the prior art cited at the outset.

The proportion of the polyurethanes (A) for inventive use in the coating materials of the invention may vary likewise extremely widely and is guided primarily by the intended use of the coating materials. Where the coating materials of the invention are curable thermally or both thermally and with actinic radiation, the amount is guided in particular by the functionality of the polyurethanes (A) with respect to the crosslinking reaction with the crosslinking agent (D). In accordance with the invention it is of advantage to use the amounts as described in the prior art cited at the outset. It is preferred to use from 10 to 80%, with particular preference from 15 to 70%, and in particular from 20 to 60% by weight, based in each case on the solids content of the coating material of the invention.

The third essential constituent of the coating material of the invention is at least one color and/or effect pigment, especially an effect pigment (B).

The pigments (B) may comprise organic or inorganic compounds. On the basis of this large number of appropriate pigments (B), therefore, the coating material, especially the aqueous basecoat and solid-color topcoat material, particularly the aqueous basecoat material, of the invention ensures a universal breadth of application and permits the realization of a large number of color shades and optical effects.

Effect pigments (B) which may be used include metal flake pigments such as commercial aluminum bronzes, aluminum bronzes chromated in accordance with DE-A-36 36 183, and commercial stainless steel bronzes, and also nonmetallic effect pigments, such as pearlescent pigments and interference pigments, for example. For further details, reference is made to Römpp, op. cit., page 176, "effect pigments", and pages 380 and 381 "metal oxide-mica pigments" to "metal pigments".

Examples of suitable inorganic color pigments (B) are titanium dioxide, iron oxides, sicotrans yellow, and carbon black. Examples of suitable organic color pigments are thioindigo pigments, indanthrene blue, Cromophtal red, Irgazine orange and Heliogen green. For further details, reference is made to Römpp, op. cit., pages 180 and 181, "iron blue pigments" to "black iron oxide", pages 451 to 453 "pigments" to "pigment volume concentration", page 563 "thioindigo pigments", and page 567 "titanium dioxide pigments".

The pigments (B) may be incorporated as they are into the coating material of the invention, provided they can be easily dispersed and do not agglomerate and/or their form, responsible for the optical effects, is not damaged or destroyed. It is of advantage in accordance with the invention for the pigments (B) to be incorporated in the form of pigment pastes. Further advantages result if the paste resins or grinding resins used are binders which are present in the coating material of the invention.

The pigment (B) content of the coating material of the invention may vary extremely widely and is guided primarily by the opacity of the pigments, the desired shade, and the desired optical effect. In the coating material of the invention, the pigments (B) are present in an amount of preferably from 0.1 to 50, more preferably from 0.5 to 45, with particular preference from 0.5 to 40, with very particular preference from 0.5 to 35, and in particular from 0.5 to 30% by weight, based in each case on the solids content of the coating material of the invention.

Besides the above-described constituents (A), (B) and (C), the coating material of the invention may comprise at least one solid, liquid or gaseous, organic and/or inorganic additive (D) of low and/or high molecular mass.

Examples of suitable additives (D) for coating materials of the invention that are curable thermally and those curable both thermally and with actinic radiation are crosslinking agents (D) such as nonblocked polyisocyanates, especially the partly or fully blocked polyisocyanates described above, and particularly those derived from the ones described above, amino resins, resins or compounds containing anhydride groups, resins or compounds containing epoxide groups, tris(alkoxycarbonylamino)triazines, resins or compounds containing carbonate groups, beta-hydroxyalkylamides, and compounds containing on average at least two groups capable of transesterification, examples being reaction products of malonic diesters and polyisocyanates or of esters and partial esters of polyhydric alcohols of malonic acid with monoisocyanates, as described in European patent EP-A-0 596 460. Crosslinking agents of this kind are well known to the skilled worker and are offered as commercial products by numerous companies.

Depending on the reactivity of the crosslinking agent (D), it may be added directly to the coating materials of the invention, producing what is known as a one-component system. If, however, it is a particularly reactive crosslinking agent (D), such as a polyisocyanate or an epoxide, it is generally not added to the coating materials of the invention until shortly before use. The result in this case is what is known as a two-component or multicomponent system.

Where the coating materials of the invention are to be curable not only thermally but also with actinic radiation (dual cure), they further comprise customary and known additives (D) which can be activated with actinic radiation. With particular preference, UV light is employed. Examples of suitable additives (D) which can be activated with actinic radiation are (meth)acryloyl-, allyl-, vinyl- or dicyclopentadienyl-functional (meth)acrylate copolymers or polyether acrylates, polyester acrylates, unsaturated polyester acrylates, epoxy acrylates, urethane acrylates, amino acrylates, melamine acrylates, silicone acrylates, or the corresponding methacrylates.

The coating material of the invention may further comprise reactive diluents (D) for the thermal curing or for the curing with actinic radiation.

Examples of suitable reactive diluents (D) for thermal curing are oligomeric polyols (D) obtainable by hydroformylation and subsequent hydrogenation from oligomeric intermediates themselves obtained by metathesis reactions of acyclic monoolefins and cyclic monoolefins; examples of suitable cyclic monoolefins are cyclobutene, cyclopentene, cyclohexene, cyclooctene, cycloheptene, norbornene and 7-oxanorbornene; examples of suitable acyclic monoolefins are contained in hydrocarbon mixtures which are obtained in petroleum processing by cracking ($C_5$ cut); examples of suitable oligomeric polyols for use in accordance with the invention have a hydroxyl number of from 200 to 450, a number average molecular weight Mn of from 400 to 1000, and a mass average molecular weight Mw of from 600 to 1100.

Further examples of suitable polyols (D) are branched, cyclic and/or acyclic $C_9$-$C_{16}$ alkanes functionalized with at least two hydroxyl groups, especially diethyloctanediols.

Further examples of polyols (D) for use are hyperbranched compounds having a tetrafunctional central group, derived from ditrimethylolpropane, diglycerol, ditrimethylolethane, pentaerythritol, tetrakis(2-hydroxyethyl)methane, tetrakis(3-hydroxypropyl)methane or 2,2-bishydroxymethyl-1,4-butanediol (homopentaerythritol). These reactive diluents may be prepared by the customary and known methods of preparing hyperbranched and dendrimeric compounds. Suitable synthesis methods are described, for example, in patents WO 93/17060 or WO 96/12754, or in the book by G. R. Newkome, C. N. Moorefield and F. Vögtle, "Dendritic Molecules, Concepts, Syntheses, Perspectives", VCH, Weinheim, N.Y., 1996.

Suitable radiation-curable reactive diluents (D) include polyfunctional, ethylenically unsaturated compounds of low molecular mass. Examples of suitable such compounds are esters of acrylic acid with polyols, such as neopentyl glycol diacrylate, trimethylolpropane triacrylate, pentaerythritol triacrylate or pentaerythritol tetraacrylate; or reaction products of hydroxyalkyl acrylates with polyisocyanates, especially aliphatic polyisocyanates.

Additionally to or instead of the above-described additives (D), the coating material of the invention may comprise customary and known binders (D).

Examples of customary and known binders (D) are oligomeric and polymeric poly(meth)acrylates or acrylate copolymers that are of linear and/or branched and/or block, comb and/or random construction, especially those described in patent DE-A-197 36 535, DE-A-44 37 535 or DE-A-197 41 554; polyesters, especially those described in patent DE-A-40 09 858 or DE-A-44 37 535; alkyds, acrylated polyesters, polylactones, polycarbonates, polyethers, epoxy resinamine adducts, (meth)acrylatediols, partially hydrolyzed polyvinyl esters, or polyureas, of which the acrylate copolymers and/or the polyesters are particularly advantageous.

The coating material of the invention may otherwise comprise customary coatings additives (D) in effective amounts. The nature and amount of the additives (D) are guided in particular by the intended use of the coating material of the invention.

Examples of suitable additives (D) are:
organic and inorganic fillers such as chalk, calcium sulfates, barium sulfate, silicates such as talc or kaolin, silicas, oxides such as aluminum hydroxide or magnesium hydroxide, nanoparticles, or organic fillers such as textile fibers, cellulose fibers, polyethylene fibers or wood flour;
UV absorbers;
free-radical scavengers;
crosslinking catalysts;
slip additives;
polymerization inhibitors;
defoamers;
emulsifiers, especially nonionic emulsifiers such as alkoxylated alkanols, polyols, phenols and alkylphenols or anionic emulsifiers such as alkali metal salts or ammonium salts of alkanecarboxylic acids, alkanesulfonic acids and sulfo acids of alkoxylated alkanols, polyols, phenols and alkylphenols;
wetting agents such as siloxanes, fluorine compounds, carboxylic monoesters, phosphates, polyacrylic acids and their copolymers, or polyurethanes;
adhesion promoters;
leveling agents;
film-forming auxiliaries such as cellulose derivatives;
flame retardants;
rheology control additives, such as those known from the patents WO 94/22968, EP-A-0 276 501 EP-A-0 249 201, WO 97/12945; crosslinked polymeric microparticles, as disclosed for example in EP-A-0 008 127; inorganic phyllosilicates, such as aluminum-magnesium silicates, sodium-magnesium and sodium-magnesium-fluorine-lithium phyllosilicates of the montmorillonite type; silicas such as Aerosils; or synthetic polymers containing ionic and/or associative groups, such as polyvinyl alcohol, poly(meth)acrylamide, poly (meth)acrylic acid, polyvinylpyrrolidone, styrene-maleic anhydride or ethylene-maleic anhydride copolymers and their derivatives or hydrophobically modified ethoxylated urethanes or polyacrylates; or
water-miscible low-boiling and high-boiling organic solvents ("long solvents");
photoinitiators, such as photoinitiators of the Norrish II type, whose mechanism of action is based on an intramolecular variant of the hydrogen abstraction reactions as occur diversely in the case of photochemical reactions; by way of example, reference may be made here to Römpp Chemie Lexikon, 9th, expanded and revised edition, Georg Thieme Verlag, Stuttgart, Vol. 4, 1991.

Further examples of suitable coatings additives (D) are described in the textbook "Lackadditive" [Additives for coatings] by Johan Bieleman, Wiley-VCH, Weinheim, N.Y., 1998.

Viewed in terms of its method, the preparation of the coating material of the invention has no special features but instead takes place by the dispersing of its constituents in water, in which context it is possible to employ primary or secondary dispersion methods and also customary and known mixing equipment such as stirred tanks, dissolvers, stirred mills, or extruders. For example, refer to the prior art cited at the outset.

The coating material of the invention, especially the aqueous basecoat material of the invention, is outstandingly suitable for producing multicoat color and/or effect paint systems on primed and unprimed substrates by the wet-on-wet technique. Additionally, the coating material, especially solid-color topcoat material, of the invention is outstandingly suitable for producing single-coat color and/or effect paint systems.

The coating material of the invention may also be used, furthermore, as an adhesive or sealing compound or as a starting product for producing self-supporting paint films.

The coating material of the invention exhibits particular advantages in its use as an aqueous basecoat material as part of the wet-on-wet technique, wherein the aqueous basecoat material is applied to the primed or unprimed substrate and dried, but not cured, a clearcoat material is subsequently applied to the aqueous basecoat film, and the resulting clearcoat film is cured together with the aqueous basecoat film, thermally or both thermally and with actinic radiation (dual cure).

Suitable substrates are all surfaces for coating which are not damaged by curing of the films present thereon using heat, or heat and actinic radiation in combination (dual cure); for example, metals, plastics, wood, ceramic, stone, textile, fiber assemblies, leather, glass, glass fibers, glass wool and rock wool, mineral-bound and resin-bound building materials, such as plasterboard and cement slabs or roof tiles, and composites of these materials. Accordingly, the multicoat paint systems of the invention are suitable for applications outside those of automotive OEM finishing and automotive refinish, as well. In this context they are particularly suitable for the coating of furniture and for industrial application, including coil coating and container coating. In the context of industrial applications they are suitable for coating virtually all parts for private or industrial use, such as radiators, domestic appliances, small metal parts such as nuts and bolts, hubcaps, wheel rims, or packaging.

In the case of electrically conductive substrates it is possible to use primers, which are prepared in a customary and known manner from electrodeposition coating materials. Both anodic and cathodic electrodeposition coating materials are suitable for this purpose, but especially cathodics. Normally, especially in the painting of automobiles, a surfacer coat or antistonechip primer coat, which may be regarded as part of the primer, is applied over the electrocoat.

It is also possible to coat, bond or seal parts made of primed or unprimed plastics, for example, ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviations to DIN 7728T1). In the case of unfunctionalized and/or apolar substrate surfaces, these may be subjected prior to coating in a known manner to a pretreatment, such as with a plasma or by flaming, or may be provided with a water-based primer.

The aqueous basecoat materials of the invention may be applied by any standard method, such as spraying, knifecoating, brushing, flowcoating, dipping, impregnating, trickling or rolling, for example. The substrate to be coated may itself be at rest, with the application device or unit being moved. Alternatively, the substrate to be coated, especially a coil, may be moved, with the application unit being at rest relative to the substrate or being moved appropriately.

It is preferred to employ spray application methods, such as compressed air spraying, airless spraying, high-speed rotation, electrostatic spray application (ESTA), for example, alone or in conjunction with hot spray applications such as hot air spraying, for example. Application can be carried out at temperatures of max. 70 to 80° C., so that suitable application viscosities are attained without the short period of thermal loading being accompanied by any changing or damage to the aqueous basecoat material or its over-spray, which may be intended for reprocessing. Hot spraying, for instance, may be configured in such a way that the aqueous basecoat material is heated only very briefly in the spray nozzle or only shortly before the spray nozzle.

It is particularly advantageous to apply the aqueous basecoat material of the invention by ESTA in a first pass and pneumatically in a second pass.

Where the aqueous basecoat materials of the invention include constituents which can be activated with actinic radiation, application is conducted preferably in the absence of light. These application methods may of course also be used for the application of the clearcoat film as part of the wet-on-wet technique of the invention.

Curing may take place after a certain rest period. This period may have a duration of from 30 seconds to 2 hours, preferably from 1 minute to 1 hour, and in particular from 1 to 45 minutes. The rest period serves, for example, for leveling and for the devolatilization of the paint films or for the evaporation of volatile constituents such as solvents.

The rest period may be shortened and/or assisted by the application of elevated temperatures up to 90° C. and/or by means of a reduced air humidity <10 g water/kg air, in particular <5 g/kg air, provided this does not cause any damage or alterations to the paint films, such as premature complete crosslinking, for instance.

Physical curing takes place even during the rest period and may be accelerated by the application of heat, with the possibility of using the methods employed below in the context of the thermal cure.

The thermal cure has no special features as far as its method is concerned but instead takes place in accordance with the customary and known methods such as heating in a forced air oven or irradiation using IR lamps. The thermal cure may also be carried out in stages. Advantageously, it takes place at a temperature from 50 to 100° C., with particular preference from 60 to 100° C., and in particular from 80 to 100° C. for a time of from 1 minute to 2 hours, with particular preference from 2 minutes to 1 hour, and in particular from 3 to 45 minutes. Where substrates with high thermal load-bearing capacities are used, thermal crosslinking may also be carried out at temperatures above 100° C. In this case it is generally advisable not to exceed temperatures of 180° C., preferably 160° C., and in particular 155° C.

The curing with actinic radiation also has no special features in terms of its method, but instead takes place in a customary and known manner by irradiation with UV lamps and/or electron beam sources, preferably under inert gas.

In the case of conjoint curing of the dual-cure aqueous basecoat films of the invention with the clearcoat films, thermal curing and actinic radiation curing may be employed simultaneously or in alternation. Where the two curing methods are used in alternation, it is possible, for example, to commence with thermal curing and to end with actinic radiation curing. In other cases it may prove advantageous to commence and to end with actinic radiation curing. The skilled worker is able to determine the curing method most advantageous for the case in hand on the basis of his or her general knowledge in the art, with or without the assistance of simple preliminary tests.

In this context it is found to be a further particular advantage of the aqueous basecoat material of the invention that, in the context of the wet-on-wet technique, all customary and known clearcoat materials may be combined with the aqueous basecoat film of the invention.

Examples of suitable known one-component (1K), two-component (2K) or multicomponent (3K, 4K) clearcoat materials are known from the patents DE-A-42 04 518, U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 and WO 92/22615.

One-component (1K) clearcoat materials comprise, as is known, hydroxyl-containing binders and crosslinking agents such as blocked polyisocyanates, tris(alkoxycarbonylamino) triazines and/or amino resins. In a further variant they comprise polymers containing lateral carbamate and/or allophanate groups as binders and amino resins modified with carbamate and/or with allophanate as crosslinking agents (cf. U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071 or EP-A-0 594 142).

Two-component (2K) or multicomponent (3K, 4K) clearcoat materials comprise as essential constituents, as is known, hydroxyl-containing binders and polyisocyanate crosslinking agents, which are stored separately until they are used.

Examples of suitable powder clearcoat materials are known, for example, from the German patent DE-A-42 22 194 or from the BASF Lacke+Farben AG product information bulletin "Pulverlacke" [powder coating materials], 1990.

The essential constituents of powder clearcoat materials are, as is known, binders containing epoxide groups, and polycarboxylic acids as crosslinking agents.

Examples of suitable powder slurry clearcoat materials are known, for example, from the U.S. Pat. No. 4,268,542 and from the German patent applications DE-A-195 18 392.4 and DE-A-196 13 547, or are described in the German patent application DE-A-198 14 471.7, unpublished at the priority date of the present specification.

Powder slurry clearcoat materials, as is known, comprise powder clearcoat materials dispersed in an aqueous medium.

UV-curable clearcoat materials are disclosed, for example, in the patents EP-A-0 540 884, EP-A-0 568 967, and U.S. Pat. No. 4,675,234.

Within the multicoat system of the invention, the thickness of the individual coats may vary widely. In accordance with the invention, however, it is of advantage for the aqueous basecoat film to have a thickness of from 5 to 25

μm, in particular from 7 to 20 μm, and for the clearcoat film to have a thickness of from 15 to 120 μm, preferably from 30 to 80 μm, and in particular from 40 to 70 μm.

The single-coat and multicoat systems of the invention have outstanding optical, mechanical, and chemical properties. For instance, they are free from any surface defects such as shrinkage (wrinkling). Moreover, they possess particularly high hiding power and outstanding optical effects, especially cloud-free metallic effects.

EXAMPLES 1 (INVENTIVE) AND C1 AND C2 (COMPARATIVE)

The Preparation and use of an Inventive Aqueous Basecoat Material (Example 1) and of Two Noninventive Aqueous Basecoat Materials (Examples C1 and C2)

For Examples 1 and C1 and C2 the following ingredients were provided/prepared:

1. Polyurethane Dispersion (A):

The polyurethane dispersion (A) was prepared in accordance with the instructions specified in German patent DE-A-44 37 535 on page 7 lines 21 to 34, "B Preparation of an aqueous polyurethane dispersion". Its solids content was 31% by weight.

2. Secondary Aqueous Acrylic Dispersion:

The secondary aqueous acrylic dispersion was prepared as described in German patent DE-A-44 37 535 on page 8 lines 25 to 49, "E Preparation of an aqueous polyacrylate dispersion". Its solids content was 40% by weight.

3. Aqueous Solution of a Polyester:

The aqueous solution of a polyester was prepared as in the instructions specified in German patent DE-A-44 37 535 on page 7 lines 6 to 19, "A Preparation of an aqueous polyester resin solution", and adjusted with water to a solids content of 60% by weight.

4. Rheological Aid:

3% aqueous suspension of a synthetic phyllosilicate; Laponite® RD from Laporte.

5. Metallic Pigment Paste:

6.0 parts by weight of a 65% suspension of aluminum flakes (Aluminium Stapa Hydrolux® from Eckart) were homogenized with 6.5 parts by weight of butyl glycol and 2.1 parts by weight of the aqueous solution of the polyester as per Section 3.

6. Melamine Resin Solution:

Maprenal® VMF 3924 (70%) from Clariant.

7. Neutralizing Agent:

10% aqueous solution of dimethylethanolamine.

8. Wetting Agent:

Commercial wetting agent from Air Products (50% in butyl glycol).

9. Silica Paste for Inventive Use:

30 parts by weight of the aqueous solution of the polyester as per Section 3, 46 parts by weight of butyl glycol, 12 parts by weight of water and 12 parts by weight of a silica powder with an average particle size of 5.8 μm and a particle density of 2.1 g cm$^{-3}$ were mixed with one another and the mixture was homogenized.

10. Solvent/Polyester Mixture of the Silica Paste

EXAMPLE 1

For Example 1, 30 parts by weight of the rheological aid of Section 4 were introduced initially into a vessel. The following ingredients were then added, with stirring, in the stated order: 27 parts by weight of the polyurethane dispersion from Section 1, 3.0 parts by weight of the polyester solution from Section 3, 6.0 parts by weight of the secondary aqueous acrylic dispersion from Section 2, 2.1 parts by weight of butyl glycol, 6.0 parts by weight of melamine resin as per Section 6, 0.3 part by weight of neutralizing agent as per Section 7, 1.5 parts by weight of the wetting agent of Section 8, and 6.0 parts by weight of deionized water. The resulting mixture was homogenized and was admixed—in this order—with 3.0 parts by weight of the silica paste for inventive use, from Section 9, and with 14.6 parts by weight of the metallic pigment paste from Section 5.

The resulting aqueous basecoat material was adjusted to a pH of from 7.8 to 8.2 using the neutralizing agent from Section 7 and to a viscosity of from 70 to 80 mPas under a shear of 1000 s$^{-1}$ using deionized water.

EXAMPLE C1

Example 1 was repeated but without the use of the silica paste from Section 9.

EXAMPLE C2

Example C1 was repeated but adding 2.64 parts by weight of the solvent/polyester mixture of the silica paste from Section 10.

To test the performance properties of the aqueous basecoat materials, test panels measuring 30×70 cm were prepared in a conventional manner. To this end, steel panels (body panels) which had been coated with a conventional cathodic electrodeposition coating, and baked, were coated with a commercial surfacer from BASF Coatings AG), after which the resulting surfacer film was flashed off at 20° C. and a relative humidity of 65% for 5 minutes and baked at 140° C. in a forced air oven for 30 minutes.

After the cooling of the test panels to 20° C., the aqueous basecoat materials were applied in two spray passes. The first application was carried out by means of ESTA (bell speed: 45,000 1/min, directing air for ESTA: 120 1/min (stp), voltage: 65 kV; distance: 0.25 m; paint outflow volume: 170 ml/min), corresponding to a dry film thickness of 8 to 10 μm. The second application was made pneumatically (distance: 0.32 m, paint outflow volume: 540 ml/min, atomizer air volume: 300 1/min (stp), atomizer air pressure: 4.8 bar, horn air volume: 0.395 1/min (stp), horn air pressure: 5.2 bar), corresponding to a dry film thickness of 4 to 6 μm. The aqueous basecoat film was flashed off for 2 minutes in each case after the first and second applications. The aqueous basecoat film was then predried at 80° C. for 10 minutes, cooled and overcoated with a commercial two-component clearcoat material (from BASF Coatings AG). Thereafter, aqueous basecoat film and clearcoat film were baked at 130° C. for 30 minutes to give the inventive multicoat effect paint system of Example 1 and the noninventive multicoat paint systems of Examples C1 and C2, with a clearcoat dry film thickness of 40 μm.

The test panels were assessed visually for light/dark shading (clouds) under diffuse light from a distance of 2 to 3 m in straight-on view (80°) and in oblique view (40°), and the results scored (1: no visible clouds, to 5: clouds very clearly visible).

For Example 1, the straight-on view score was 2 and the oblique view score 3. For Examples C1 and C2, the score was 4 in each case for straight-on viewing and 5 in each case for oblique viewing. This underlines the fact that the use of the silicon dioxide-in accordance with the invention achieves a significant improvement in light/dark shading.

What is claimed is:

1. An aqueous coating material curable physically, thermally and with actinic radiation comprising
    A) at least one stabilized polyurethane, as binder
    B) at least one effect pigment or a mixture of a color pigment and an effect pigment, and
    C) at least one transparent or colorless powder present in an amount of from 0.09 to 5.0% by weight, based on the solids content of the coating material, the powder C) being substantially inert with respect to the other constituents of the coating material and whose particles have an average particle size of from 3.0 to 7.5 µm, a particle size distribution such that the maximum particle size is below 10 µm, and a density of from 0.8 to 3.6 g cm$^{-3}$,
    wherein the at least one stabilized polyurethane, the at least one effect pigment, and the at least one transparent or colorless powder are present in a combination such that a coating prepared from the aqueous coating material provides a cloud free metallic effect.

2. The aqueous coating material of claim 1, wherein the particles have an average particle size of from 4.0 to 7.0 µm.

3. The aqueous coating material of claim 1 wherein the particles have a density of from 0.9 to 3.2 g cm$^{-3}$.

4. The aqueous coating material of claims 1 wherein the particles have a spherical shape.

5. The aqueous coating material of claim 1, wherein the particles comprise substances selected from the group consisting of organic polymers, organometallic polymers, inorganic minerals, salts, ceramic materials, organically modified ceramic materials, and mixtures of these substances.

6. The aqueous coating material of claim 5 wherein the particles are composed of one or more members selected from the group consisting of silicon dioxide, aluminum silicates, calcium silicates, magnesium silicates, calcium aluminum silicates, magnesium aluminum silicates, calcium magnesium silicates, calcium magnesium aluminum silicates, beryllium aluminum silicates, aluminum phosphate, calcium phosphate, and mixtures thereof.

7. The aqueous coating material of claim 1 wherein the stabilized polyurethane binder is selected form the group consisting of ionically stabilized polyurethanes, nonionically stabilized polyurethanes, polyurethanes stabilized both ionically and nonionically, and mixtures thereof.

8. The aqueous coating material of claim 7 wherein the stabilized polyurethane binder is selected from the group consisting of saturated polyurethanes, unsaturated polyurethanes, polyurethanes grafted with olefinically unsaturated compounds, and mixtures thereof.

9. The aqueous coating material of claim 1, wherein the particles have a spherical shape and are selected from the group consisting of silicon dioxide, aluminum silicates, calcium silicates, magnesium silicates, calcium aluminum silicates, magnesium aluminum silicates, calcium magnesium silicates, calcium magnesium aluminum silicates, beryllium aluminum silicates, aluminum phosphate, calcium phosphate, and mixture thereof.

10. The aqueous coating material of claim 1, wherein the coating material provides the cloud-free metallic effect when the coating material is applied at a thickness of about 5 µm to about 120 µm.

11. A process for making a coated system, comprising applying the aqueous coating material of claim 1 to a substrate and forming a coating that does not exhibit clouding.

12. The process of claim 11, wherein the aqueous coating material is used as aqueous basecoat material in automotive OEM finishing and automotive refinish.

13. The process of claim 11, wherein the aqueous costing material is used as a solid-color topcoat material in automotive OEM finishing and automotive refinish.

14. A process for producing a single-coat or multicoat color and/or effect paint system by applying at least one coat of the aqueous coating material of claims 1 to a substrate and subjecting the resultant wet film(s) to a curing method selected from the group consisting of thermal curing, actinic light and mixtures thereof, wherein the cured film(s) does not exhibit clouding.

15. A process for producing a multicoat color and/or effect paint system by the wet-on-wet technique, comprising
    (I) applying an aqueous basecoat film to a primed or unprimed substrate,
    (II) flashing off and predrying the resulting aqueous basecoat film,
    (III) applying a clearcoat film to the aqueous basecoat film, and
    (IV) curing the two wet films thermally or with heat and actinic light,
    which comprises using as aqueous basecoat material the aqueous coating material of claims 1, wherein the cured film does not exhibit clouding.

* * * * *